United States Patent [19]
McIntosh

[11] Patent Number: 6,042,137
[45] Date of Patent: Mar. 28, 2000

[54] HEIGHT ADJUSTABLE TRAILER HITCH

[76] Inventor: Wesley R. McIntosh, Rte. 1 Box 67, Highway 115, St. Landry, La. 71367

[21] Appl. No.: 08/902,522

[22] Filed: Jul. 29, 1997

Related U.S. Application Data

[60] Provisional application No. 60/030,111, Nov. 4, 1996.

[51] Int. Cl.$^7$ ....................................... B60D 1/46
[52] U.S. Cl. ..................... 280/490.1; 280/462; 280/494
[58] Field of Search ................. 280/490.1, 462, 280/477, 478.1, 497, 494

[56] References Cited

U.S. PATENT DOCUMENTS

| | | |
|---|---|---|
| 1,181,877 | 5/1916 | Hanson . |
| 1,494,268 | 5/1924 | Mendenhall .................. 280/490.1 |
| 1,655,351 | 1/1928 | Altgelt ............................. 280/490.1 |
| 1,914,963 | 6/1933 | Stephens ......................... 280/490.1 |
| 3,664,686 | 5/1972 | Anderson ........................ 280/490.1 |
| 3,843,163 | 10/1974 | Hale . |
| 4,248,451 | 2/1981 | Usinger .......................... 280/490.1 |
| 4,280,713 | 7/1981 | Bruhn ............................. 280/490.1 |
| 4,391,562 | 7/1983 | Hetzner . |
| 5,354,087 | 10/1994 | Head . |
| 5,358,269 | 10/1994 | Jakeman et al. . |
| 5,413,366 | 5/1995 | Gibbons . |

FOREIGN PATENT DOCUMENTS

| | | |
|---|---|---|
| 442999 | 6/1926 | Germany . |
| 2040487 | 9/1980 | United Kingdom ............... 280/490.1 |

*Primary Examiner*—Lanna Mai
*Assistant Examiner*—Andrew J. Fischer
*Attorney, Agent, or Firm*—Richard C. Litman

[57] ABSTRACT

Two light weight and height adjustable trailer hitch devices for towing a trailer. The hitches include a vertical hinge joint block element which attaches to the trailer, a vertical hinge joint block element which is attached to the towing vehicle's bumper, and a center block element for variably connecting said hinge joint block elements. In one embodiment, apertured clevises support a rotatable joint block element which is supported further by a pair of reinforcing strips attached to the outside of the first hitch device. A second hitch device employs a double-yoked center block element rotatably mounted in a clevis and including a vertical apertured disc. The hitches allow a trailer to remain level always, even when attached to vehicles with bumpers of various heights.

15 Claims, 4 Drawing Sheets

HEIGHT ADJUSTABLE TRAILER HITCH

CROSS-REFERENCE TO RELATED APPLICATION

This application claims the benefit of U.S. Provisional Patent Application Ser. No. 60/030,111, filed Nov. 4, 1996.

BACKGROUND OF THE INVENTION

1. Field of the Invention

The present invention relates to a lightweight adjustable trailer hitch device for towing by a vehicle.

2. Description of Prior Art

The patent literature includes many different types of trailer hitches, each made to meet one or more requirements of trailer hitches. One such requirement is the desirability of maintaining the towed vehicle in a horizontal or level position, irrespective of the height of the particular towing hitch to which it is connected. Not only is the load more evenly distributed in a level trailer, but the performance of the trailer as a road vehicle is thereby enhanced, since the suspension is generally designed for maximum performance at a horizontal attitude.

Adjustable height trailer hitches have been provided in the related art which will be discussed in the order of their perceived relevance to the present invention.

United Kingdom Patent Document No. 2,040,847 A published Sep. 3, 1980, for Reginald J. Broomer et al. describes as a third embodiment a height adjustable towbar which provides a link of the towbar lockable in adjusted positions by pivoting from an upper lug at both ends from brackets having five aligned holes along its lower edges to match with another lug on the lower end of the link ends. The differences in structure are pronounced in that a link with lugs between flanges is diametrically opposed to a yoked link accepting a single perforated flange.

German Patent Document No. 442,999 issued Jun. 10, 1926, to George Seitz describes a ratcheting hitch with a central member (with circular geared teeth at each end) that may assume various angles with respect to the connective members (with circular geared teeth ends and locking means) that engage the tow vehicle and the trailer. The weakness of this type of hitch is clear.

U.S. Pat. No. 1,914,963 issued on Jun. 20, 1933, to William T. Stephens describes a hitch for a tractor having a block with a pair of circular ears with apertures around the edges held by a trailer frame. An apertured disc matching the apertures with the circular ears has an apertured tongue. The tractor drawbar has a clevis with an apertured projection to connect with the apertured tongue of the disc. Two diametrically opposed pins are inserted through appropriate apertures of the disc and ears to adjust the height. The link in the present invention has only two apertures to connect the vehicle and trailer.

U.S. Pat. No. 1,181,877 issued on May 2, 1916, to Bennie P. Hanson describes an elementary means of adjusting the height of the light trailer by providing a question mark-shaped link with the hook portion facing upwards. There are a series of openings at each end of the link to hook up with the clevis of the vehicle and with the parallel ears of the tender's end members and the long bolt traversing the end members. This weak structure is unsuitable for present day needs for heavy trailers.

U.S. Pat. No. 5,358,269 issued on Oct. 25, 1994, to Walter L. Jakeman et al. describes a trailer hitch structure which provides for coupling a ball hitch of a trailer to a truck mount (step in bumper) with an inverted L-shaped and channeled carrier which confines an apertured similar L-shaped support member for the trailer's ball connector. The support member is thus adjustable in height. The structure is totally dissimilar from the present invention.

U.S. Pat. No. 4,248,451 issued on Feb. 3, 1981, to Roger Usinger describes a hitch assembly with a similar configuration with two L-shaped members with the second component sliding up or down the first component which is attached to the vehicle. The reference is distinguished by the clear difference in structure.

U.S. Pat. No. 5,354,087 issued on Oct. 11, 1994, to Harold W. Head describes an adjustable trailer hitch includes a stationary plate attached to the vehicle and a sliding plate with a tongue and coupler assembly attached to the trailer as the means of providing adjustment in height. The configuration is clearly distinct from the present invention.

U.S. Pat. No. 5,413,366 issued on May 9, 1995, to Eldon L. Gibbons describes a vertically adjustable trailer hitch which includes a fixed guide portion with reinforcement struts adapted for securement to a trailer hitch tongue and a vertically slidable component mounted for vertical adjustment thereon by a pair of latch pins. The hitch of this reference is distinguished by its slidable component structure.

U.S. Pat. No. 4,391,562 issued on Jul. 5, 1983, to Randall H. Hetzner describes an adjustable trailer drawbar wherein vertical adjustment of the rear end (under the trailer) of the elongated box-like drawbar on a channel-shaped and apertured anchor member effects vertical adjustment of its forward end by the use of a fulcrum under the front edge of the trailer to compensate for varying height trailer hitches on different vehicles and to enable the trailer bed to occupy a substantially horizontal position. This reference is distinguished by its different structure.

U.S. Pat. No. 3,843,163 issued on Oct. 22, 1974, to William B. Hale describes a Y-shaped trailer frame connected to a Y-shaped auxiliary frame having a threaded rod passing through the bottom leg and joined to an arm of a U-bolt around the leg of the trailer frame. This configuration is distinctive and offers no common structure with the present invention.

None of the above patents disclose a height adjustable trailer hitch assembly device for a vehicle towing device wherein the hitch comprises a vertical hinge joint block element which attaches to the trailer, a vertical hinge joint block element which is attached to the towing vehicle's bumper, and a horizontal block element for connecting said block elements. The hitch allows a trailer to remain level while capable of being attached to vehicles with bumpers of various heights, as defined by the claims.

None of the above inventions and patents, taken either singularly or in combination, is seen to describe the instant invention as claimed.

SUMMARY OF THE INVENTION

The present invention is a height adjustable trailer hitch for towing a trailer by a vehicle. The hitch assembly includes a vertical hinge joint block element which attaches to the trailer, a vertical hinge joint block element which is attached to the vehicle bumper, and a horizontal center block element for pivotally connecting said vertical block elements. The hitch assembly allows a trailer to remain level while capable of being attached to vehicles with bumpers of various heights.

Accordingly, it is a principal object of the invention to provide a height adjustable trailer hitch assembly device for a vehicle towing a trailer, which hitch maintaining a trailer during travel at a level position while allowing the hitch to be connected to a towing vehicle having a bumper of a different height.

It is another object of the invention to provide a first embodiment of a height adjustable trailer hitch device consisting of two vertical block elements with apertured clevis elements connected by a horizontal block element.

It is a further object of the invention to provide a second embodiment of a height adjustable trailer hitch assembly device consisting of two block elements with substantially circular, vertical and apertured plates connected by a yoked block element.

It is an object of the invention to provide improved elements and arrangements thereof in a height adjustable trailer hitch for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides a height adjustable trailer hitch device. The hitch includes a vertical hinge joint block which attaches to the trailer, another vertical hinge joint block which is attached to the vehicle bumper, and a horizontal center block for pivotally connecting said blocks. The hitch allows a trailer to remain level while capable of being attached to vehicles with bumpers of various heights.

Figure 1:
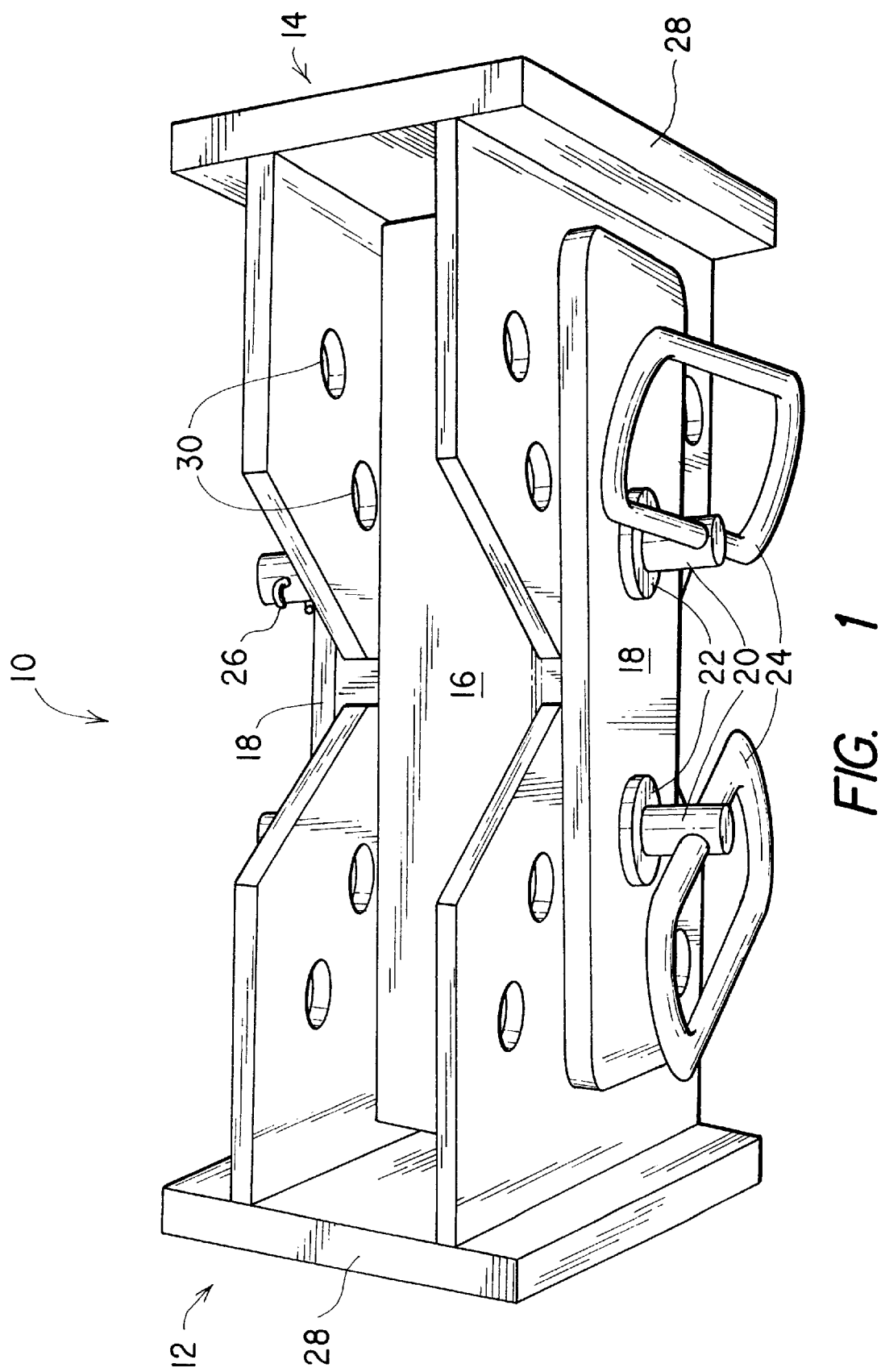
FIG. 1 is a perspective view of a first embodiment of a trailer hitch of the present invention.

FIG. 1 illustrates the preferred first embodiment of the present invention, a height adjustable trailer hitch device 10 for towing a trailer by a vehicle having a bumper with a different height. The hitch 10 comprises (1) a first vertically disposed metal hinge joint block element 12 in the shape of a clevis which attaches to a towing vehicle's bumper (not shown); (2) a similarly shaped, second vertically disposed metal hinge joint block element 14 which attaches to a trailer connection (not shown); (3) a massive metal center block element 16 with either a rectangular solid or hollow cross-section for rotatably connecting the respective first and second block elements 12 and 14 by having a pair of aligned throughbores (hidden); (4) a pair of metal strips 18 having a pair of apertures (hidden) which secure the center block element 16 with the hinge joint block elements 12, 14 on the sides; and (5) two metal pins 20 with shoulders 22 and large metal ring handles 24 on one end and secured by cotter pins 26 or the like on the opposite end.

Each of the first and second hinge joint block elements 12 and 14 has a metal vertical backing plate portion 28 forming part of the clevis. The clevis has at least five aligned apertures 30 arranged equidistantly in a semicircle to implement the height adjustment of the hitch device 10. Although the clevises are depicted in FIG. 1 as having sharp angular corners in their front portions, it is within the ambit of the invention to modify the angular corners to smooth corners. The advantages of the present invention reside in its light weight of only 12 lbs. and can be fabricated in several hours. The alignment feature and cooperating additional structures for attachment to the vehicle bumper and the trailer will be shown in FIGS. 2–4.

Figure 2:
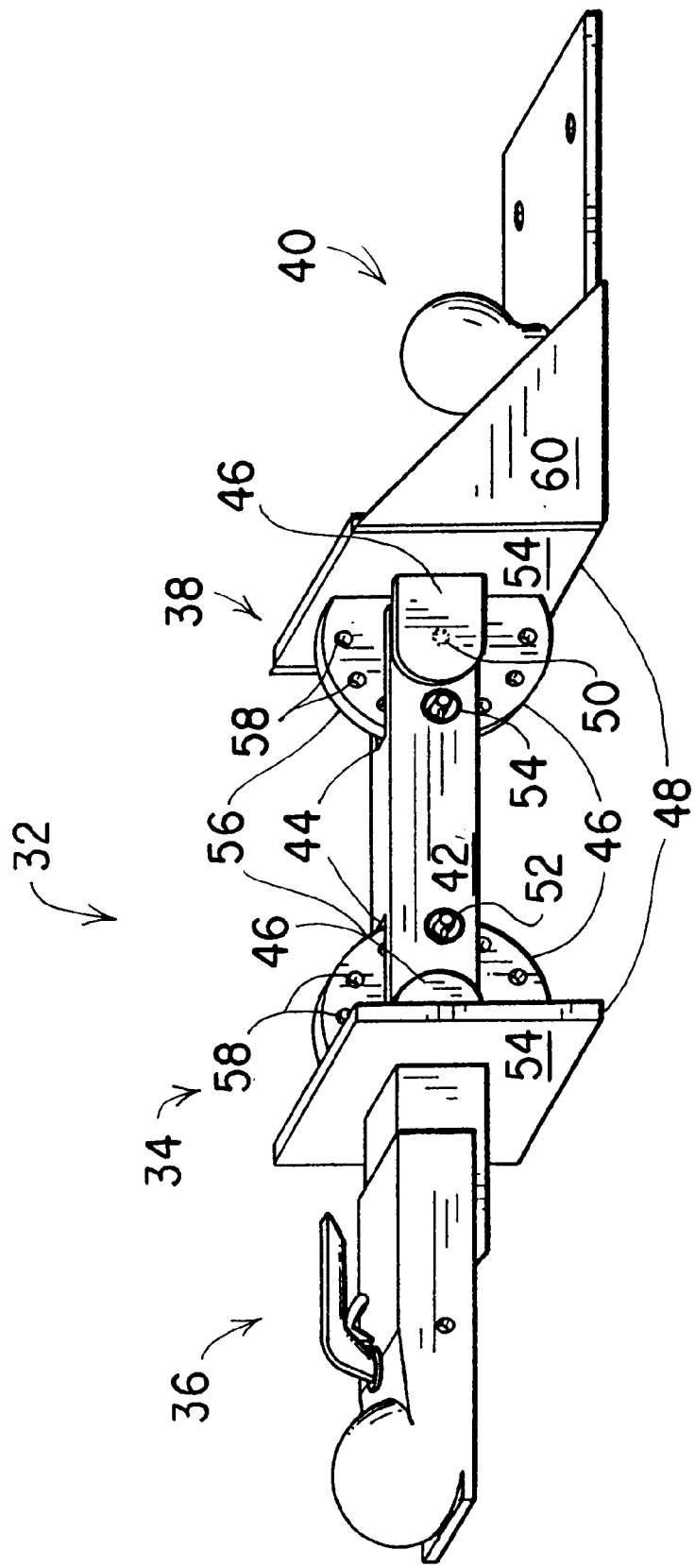
FIG. 2 is a perspective view of a second embodiment of a trailer hitch of the present invention.
Figure 3:
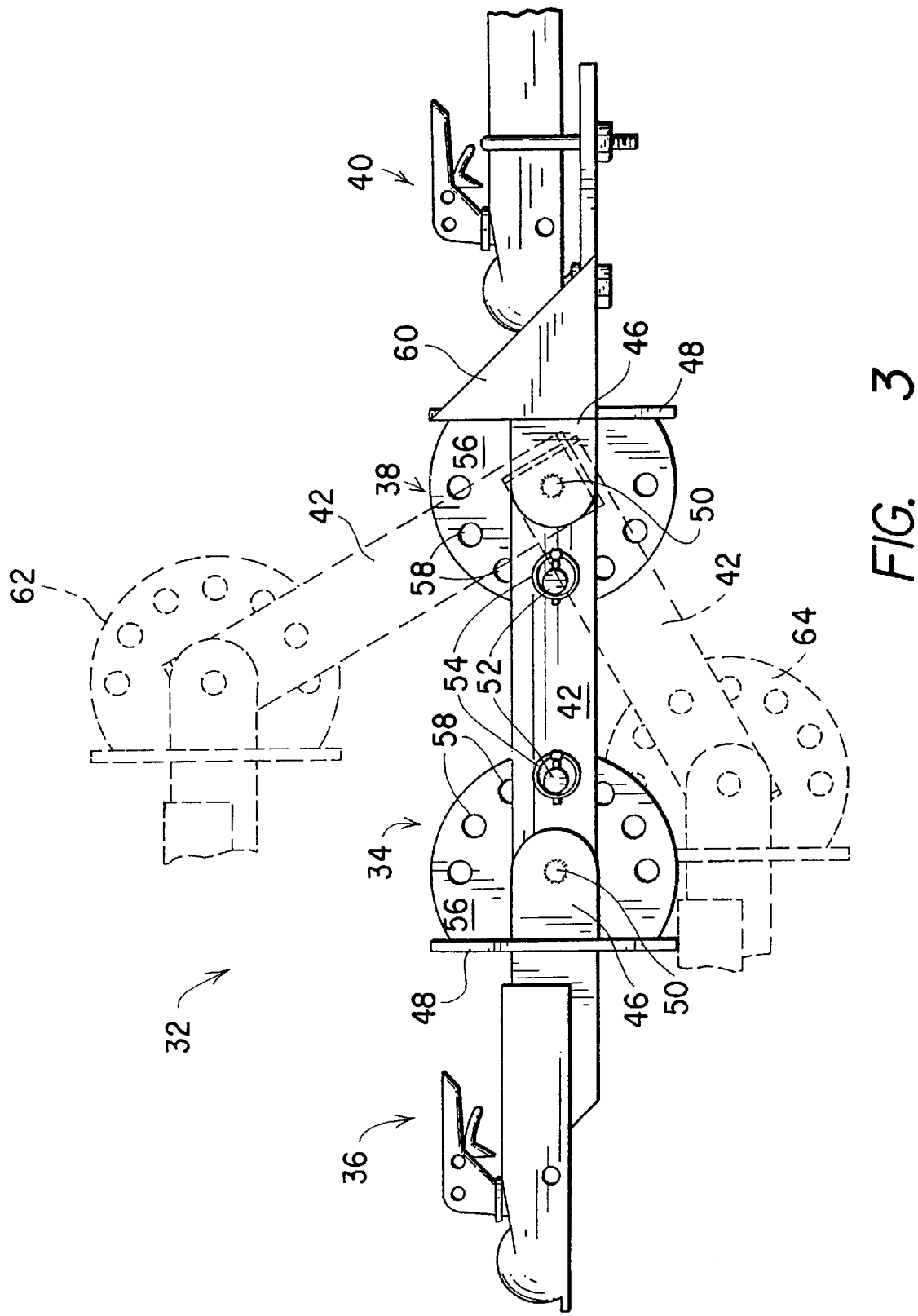
FIG. 3 is a side elevational view of the FIG. 2 embodiment.
Figure 4:
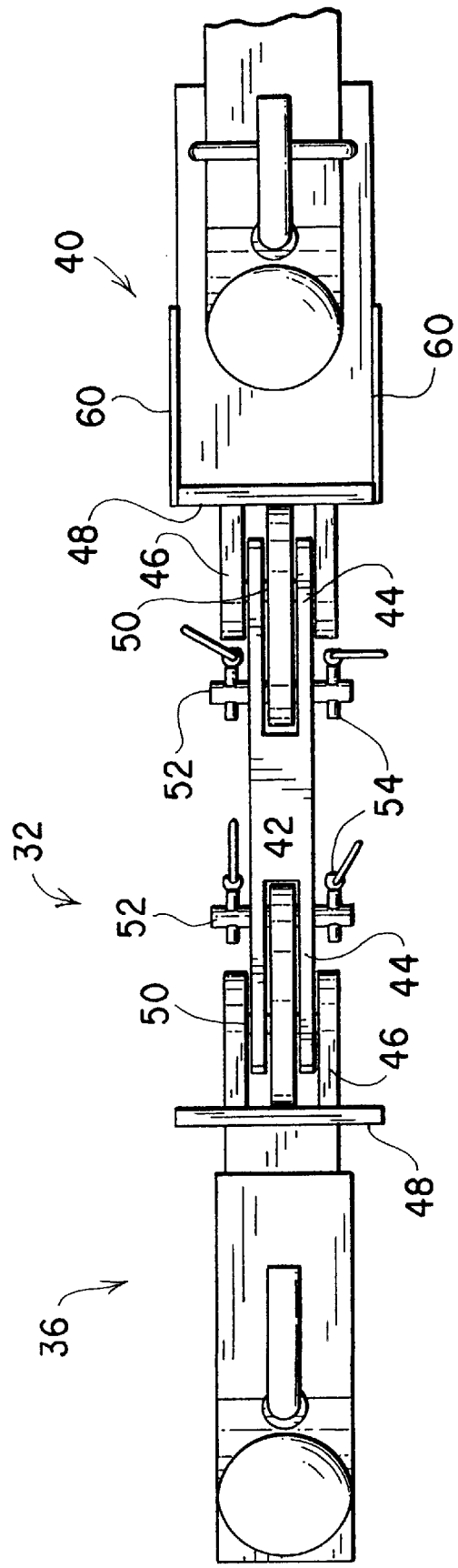
FIG. 4 is a plan view of the FIG. 2 embodiment.

With reference to FIGS. 2–4 as a second embodiment, there is illustrated a height adjustable trailer hitch device 32 for towing a trailer by a vehicle. The hitch device 32 comprises: (1) a first vertically disposed hinge joint block element 34, on the left, which attaches to a bumper portion 36 which is further connected to a towing vehicle's bumper (not shown); (2) a second vertically disposed hinge joint block element 38, on the right, which attaches to a trailer portion 40 which is further connected to the towed vehicle's frame (not shown); (3) a center block element 42 having yokes 44 at opposite ends for rotatably connecting the respective first and second block elements 34 and 38; (4) devises 46 supported by backing plates 48 as part of hinge joint block elements 34, 38 which secure the respective ends of the center block element 42 with the hinge joint block elements 34, 38 by an axle 50; and (5) two pins pivoting 52 anchored by locking pins 48 having circular handles on each end of the pins 52.

Each vertically disposed joint block element 34 and 38 comprise a vertically disposed rectangular backing plate 54 which supports a clevis 46 which straddle plate 56 having a partially circular front and a straight rear edge and seven peripheral apertures 58 spaced equidistantly.

As an optional modification, the backing plate 48 of the trailer portion 40 has two triangular side plates 60 positioned vertically on the side edges of the backing plate 48 for additional support.

The hitches 10 and 32 allow the trailer to remain level while attached to vehicles with bumpers of various heights, and this can be readily appreciated from an inspection of FIG. 3 which depicts in shadow two possible positions 62 and 64 of the hitch 32. It is understood that the pins 20, 52 secure and fix the pivoted center block elements 16, 42, so that there is no rotation around the pins 20, 52 for the towing operation.

It is to be understood that the present invention is not limited to the embodiments described above, but encompasses any and all embodiments within the scope of the following claims.

I claim:

1. A height adjustable trailer hitch device in combination with a trailer comprising:
    a trailer;
    a height adjustable trailer hitch device further comprising:
        a first vertical hinge joint block element for attachment to a vehicle and having a predetermined plurality of holes;
        a second vertical hinge joint block element to attach to the trailer and having a predetermined plurality of holes;
        a pair of pin members;
        a center block element connecting said first joint block element and said second joint block element, said center block element having a first end and a second end, each of said first and second ends being provided with a plurality of apertures for selectively receiving a pin member; and a pair of elongated plates supporting the center block element, the first joint block element and the second joint block element, by being fixedly positioned to the first and second joint block elements by the pair of pin members inserted through selected ones of said holes and apertures;

whereby the trailer remains level while being attached to the towing vehicle by pivoting and securing the center block element at its ends with the respective first and second vertical hinge joint block elements by selecting a suitable aperture.

2. The combination height adjustable trailer hitch device and trailer according to claim 1, wherein each of the pair of pins having a hand ring for retracting the pins from the vertical hinge joint block elements.

3. The combination height adjustable trailer hitch device and trailer according to claim 1, wherein the vertical hinge joint block elements being integral with and perpendicular to vertical rectangular backing plates.

4. The combination height adjustable trailer hitch device and trailer according to claim 1, wherein the height adjustable trailer hitch device is configured and dimensioned to interconnect a towing vehicle having a ball member on a predetermined bumper and the trailer.

5. The combination height adjustable trailer hitch device and trailer according to claim 1, wherein each of said first and second vertical hinge joint block elements are identically configured as partial circular plates with peripheral equidistant apertures.

6. The combination height adjustable trailer hitch device and trailer according to claim 5, wherein each partial circular plate being held by the center block element having yoked ends.

7. A height adjustable trailer hitch device in combination with a trailer comprising:

a trailer;

a height adjustable trailer hitch device comprising:
   a first vertical hinge joint block element having a clevis with a predetermined plurality of holes for attachment to a vehicle;
   a second vertical hinge joint element having a clevis with a predetermined plurality of holes for attachment to a trailer;
   a pair of pin members;
   a pivoting center block element connecting the clevises of said first joint block element, said center block element having a first pivoting end and a second pivoting end, each of said first and second pivoting ends having an aperture for selectively receiving a pin member; and
   a pair of elongated plates supporting the center block element, the first joint block element and the second joint block element, by being fixedly positioned to the first and second joint block elements by the pair of pin members inserted through selected ones of said holes and apertures;

whereby the trailer remains level while being attached to the towing vehicle by pivoting and securing the center block element at its ends with the respective first and second vertical hinge joint block elements.

8. The combination height adjustable trailer hitch device and trailer according to claim 7, wherein each of the pair of pins having a hand ring for retracting the pins from the vertical hinge joint block elements.

9. The combination height adjustable trailer hitch device and trailer according to claim 7, wherein the vertical hinge joint block elements being integral with and perpendicular to vertical rectangular backing plates.

10. The combination height adjustable trailer hitch device and trailer according to claim 7, wherein the height adjustable trailer hitch device is configured and dimensioned to interconnect a towing vehicle having a ball member on a predetermined bumper and the trailer.

11. A height adjustable trailer hitch device in combination with a trailer comprising:

a trailer;

a height adjustable trailer hitch device further comprising:
   a first vertical hinge joint block element for attachment to a vehicle;
   a second vertical hinge joint block element for attachment to the trailer;
   each of said first and second vertical hinge joint block elements having a clevis with an axle supporting a fixed vertical and partially circular plate with a predetermined plurality of peripheral apertures;
   a pair of pin members; and
   a center block element pivotally connecting said first joint block element and said second joint block element, said center block element having a first yoked end and a second yoked end which receive said respective partially circular plates;

whereby the trailer remains level while being attached to the towing vehicle by pivoting and securing the center block element at its ends with the respective first and second vertical hinge joint block elements.

12. The combination height adjustable trailer hitch device and trailer according to claim 11, wherein the pair of pins have hand rings and anchoring pins at opposite ends for retracting the pins from the vertical hinge joint block elements.

13. The combination height adjustable trailer hitch device and trailer according to claim 11, wherein the height adjustable trailer hitch device is configured and dimensioned to interconnect a towing vehicle having a ball member on a predetermined bumper and the trailer.

14. The combination height adjustable trailer hitch device and trailer according to claim 11, wherein the vertical hinge joint block elements being integral with and perpendicular to vertical rectangular backing plates.

15. The combination height adjustable trailer hitch device and trailer according to claim 14, wherein said backing plates being reinforced with triangular plates at its sides.

* * * * *